United States Patent [19]
Bang

[11] Patent Number: 5,621,625
[45] Date of Patent: Apr. 15, 1997

[54] SURGE PROTECTION CIRCUIT FOR A SWITCHING MODE POWER SUPPLY

[75] Inventor: Jeong-Ho Bang, Suwon, Rep. of Korea

[73] Assignee: SamSung Electronics Co., Ltd., Suwon, Rep. of Korea

[21] Appl. No.: 519,281

[22] Filed: Aug. 25, 1995

[30] Foreign Application Priority Data

Aug. 25, 1994 [KR] Rep. of Korea ............... 21007/1994

[51] Int. Cl.[6] .................................................. H02M 3/335
[52] U.S. Cl. ............................ 363/21; 363/56; 363/97
[58] Field of Search .............................. 363/20, 21, 56, 363/132, 97; 361/18, 91

[56] References Cited

U.S. PATENT DOCUMENTS

| | | | |
|---|---|---|---|
| 4,755,922 | 7/1988 | Puvogel | 363/21 |
| 5,029,269 | 7/1991 | Elliot | 363/21 |
| 5,075,838 | 12/1991 | Schnetzka, II et al. | 363/37 |
| 5,099,406 | 3/1992 | Harada | 363/20 |
| 5,227,964 | 7/1993 | Furuhata | 363/56 |
| 5,424,933 | 6/1995 | Illingworth | 363/21 |
| 5,448,469 | 9/1995 | Rilly et al. | 363/21 |

*Primary Examiner*—Peter S. Wong
*Assistant Examiner*—Adolf Berhane
*Attorney, Agent, or Firm*—Robert E. Bushnell, Esq.

[57] ABSTRACT

A surge protection circuit for a switching mode power supply utilizing the switching phase difference of substantially 180 degree between primary and secondary coils of a switching power supply transformer snubs surges induced on both sides of the power supply transformer by attenuating the surges induced during ON/OFF operations of a switching transistor which controls the power supply transformer. Accordingly, heat caused during the ON/OFF operation of the switching transistor is reduced and secondary rectifier diodes connected to the secondary winding of the power transformer are protected from damages The surge protection circuit uses a pair of capacitors connected in series between a control terminal of the primary coil and an output terminal of the secondary coil of the switching power supply transformer for snubbing bi-directional surges induced by the ON/OFF operation of the switching transistor.

10 Claims, 4 Drawing Sheets

SURGE PROTECTION CIRCUIT FOR A SWITCHING MODE POWER SUPPLY

CROSS REFERENCE TO RELATED APPLICATIONS

This application makes reference to, incorporates herein and claims all benefits accruing under 35 U.S.C. §119 from our application earlier filed in the Korean Industrial Property Office on 25 Aug. 1994 entitled SURGE PROTECTION CIRCUIT FOR SWITCHING MODE POWER SUPPLY, which was duly assigned Ser. No. 94-21007 by that Office.

BACKGROUND OF THE INVENTION

The present invention relates to a surge protection circuit for a switching mode power supply, and more particularly, to a surge protection circuit for a power supply in a switching mode capable of snubbing primary and secondary currents and surge voltages at both the primary and the secondary windings of a switching power supply transformer.

Switching mode power supplies are generally well known in the art to include a switching transistor driven in response to a drive signal, for generating a switching pulse signal in order to control a power supply transformer in an effort to output a voltage having a constant or fixed amplitude. Generally, these switching mode power supplies require a protection circuit to protect the load, or to protect components within the power supply from an overvoltage, an overcurrent or an induced surge. Such switching mode power supplies are discussed in U.S. Pat. No. 5,227,964 to Shoichi Furuhata entitled Switching Power Supply With Overcurrent Protection Circuit. Furuhata's '964 patent illustrates switching mode power supply having a resonant capacitor and a surge absorber connected in parallel with the primary winding of the power supply transformer. The surge absorber used to protect the switching transistor. An overcurrent protective circuit is connected to the power supply to detect overcurrent on the secondary side of the power supply transformer. The overcurrent protective circuit temporarily interrupts the output of the switching mode power supply by preventing a drive signal from being applied to the switching transistor.

A switching mode power supply having overvoltage protection is discussed in U.S. Pat. No. 5,029,269 to Brent Elliott, et al., entitled Delayed Power Supply Overvoltage Shutdown Apparatus. This power supply uses a error detector connected to the secondary side of the power supply transformer for detecting changes in the output voltage applied to a load. The detected error controls the ON/OFF durations, i.e., duty cycle, of a switching transistor connected to the control terminal of the primary winding of the power supply transformer in order to maintain the output voltage at a fixed level. An overvoltage detector is also connected to the secondary side of the power supply transformer and is used for momentarily shutting down the power supply by blocking a drive signal from being applied to the gate of the switching transistor. If the overvoltage persists for a predetermined amount of time, the power supply is shut down permanently.

A switching mode power supply having surge voltage prevention is discussed in U.S. Pat. No. 5,099,406 to Kosuke Harada, et al. entitled DC-DC Converter With Surge Voltage Prevention. This power supply has a switching transistor connected to the control terminal of the primary winding of the power transformer. A snubber circuit is connected in parallel across the drain and source of the switching transistor to protect the switching transistor and the windings of the power transformer from surge voltages. This method of protection, however, can not completely prevent the occurrence of surge voltages.

SUMMARY OF THE INVENTION

It is an object of the present invention to provide an improved surge protection circuit.

It is another object to provide a surge protection circuit for a switching mode power supply using a snubbing circuit, to protect the components of the power supply from surge voltages not suppressed by the snubbing circuit.

It is also an object of the present invention to provide a surge protection circuit for a power supply to safely protecting a secondary rectifier diode during a switching mode from a surge generated during the ON and OFF operation of a power supply transformer.

It is another object of the present invention to simultaneously attenuate surges across the primary and secondary windings of a switching power supply transformer using a phase difference of 180 degrees between those windings to protect a secondary rectifier diode in the circuit of the power supply.

These and other objects may be achieved with a surge protection circuit for a power supply. A switching mode power supply circuit constructed according to the principles of the present invention is contemplated with a voltage doubler for free voltage reception to supply voltage at a constant level across the primary winding of a power supply transformer, a switching transistor driving the power supply transformer, the switching transistor being turned on or off by a switching drive signal having an adjusted duty factor, or duty cycle, set at a power voltage level detected at terminals of a secondary winding of the power supply transformer, and a snubbing circuit for snubbing bi-directional surges provided between a drain of the switching transistor and an anode of a secondary rectifier diode. The snubbing circuit simultaneously attenuates a reverse surge induced at the drain terminal of the switching transistor at the instant that the switching transistor is turned off by a first one of the secondary windings and attenuates surges having pulses at a relatively higher voltage level induced at the anode of the secondary rectifier diode at the initial moment of driving the power supply transformer by the second winding of the power supply transformer.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

In the following detailed description, many specific details are set forth to provide a more thorough understanding of the present invention. It will be apparent, however, to those skilled in the art, that the present invention may be practiced without these specific details. In other instances, well known circuits have not been described so as not to obscure the present invention.

DETAILED DESCRIPTION OF THE PREFERRED EMBODIMENT

Figure 1:
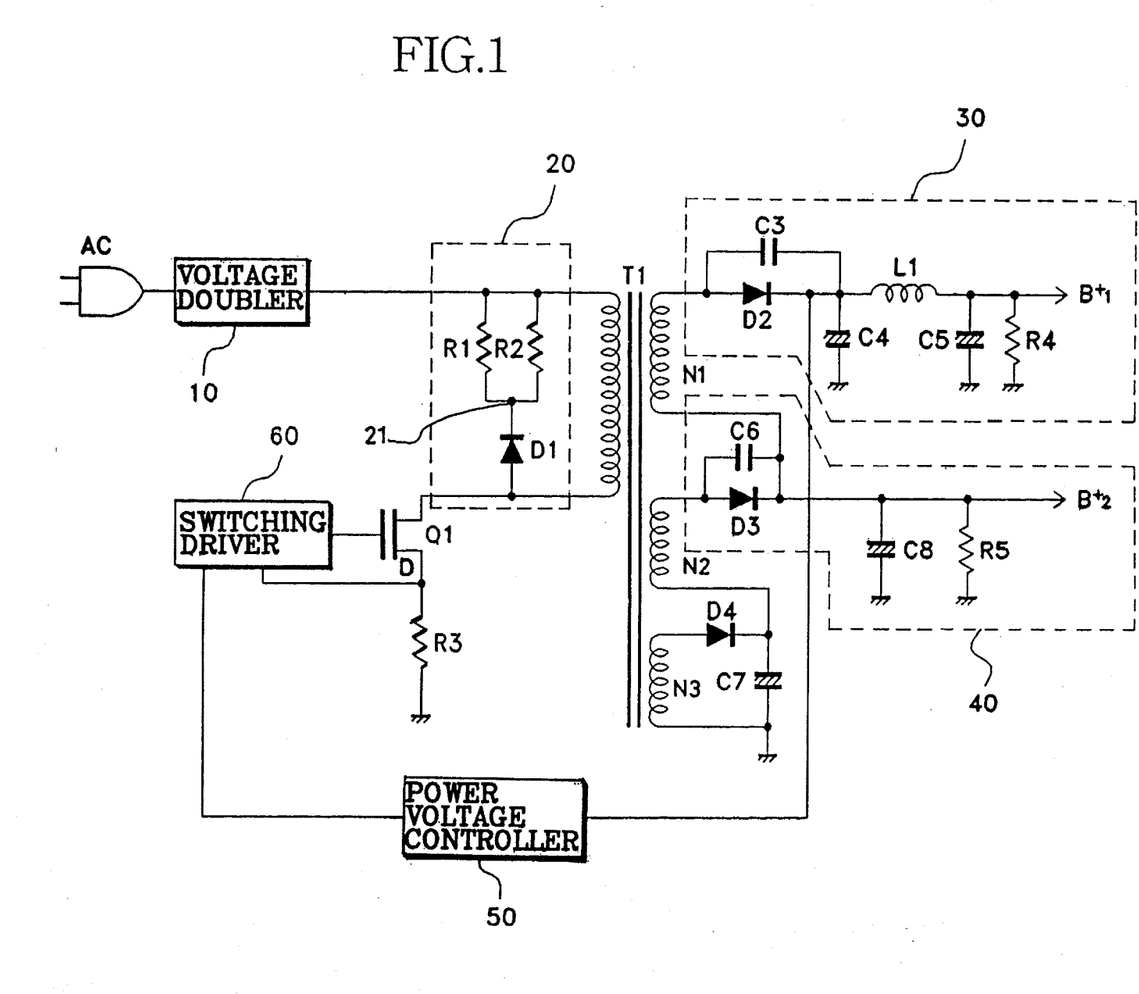
FIG. 1 is a circuit diagram illustrating one conventional design for a surge protection circuit.

Turning now to the drawings, a representation of an exemplary design for a surge protection circuit is illustrated in FIG. 1. A voltage doubler 10 for doubling the amplitude of an input alternating current (AC) power source to a certain voltage level, is connected to a first terminal of a primary winding of a power supply transformer T1. A drain of a switching transistor Q1 is connected to the opposite, or second terminal of the primary winding of power supply transformer T1, and a source of transistor Q1 is connected to a reference potential (such as a local circuit ground) via a resistor R3. A gate electrode of switching transistor Q1 is coupled to receive a driving signal generated by switching driver 60 to control the operation of power supply transformer T1.

A snubber circuit 20 uses a pair of resistors R1 and R2 coupled in parallel between the first terminal of the primary winding and a node 21. A diode D1 has a cathode coupled to node 21 and an anode coupled to the opposite terminal of the primary winding. The first node 21 commonly connects resistors R1 and R2 to the cathode of diode D1. An anode of diode D1 is connected to the drain of switching transistor Q1 and to the control, or second terminal of the primary winding of power supply transformer T1. Snubber circuit 20 protects switching transistor Q1 from a reverse surge of current from power supply transformer T1 during an OFF (i.e. while the drain-source channel of transistor Q1 is in a non-conductive state) mode of operation of transistor Q1 because snubber circuit is coupled between both terminals of the primary winding of the power supply transformer T1.

A first output terminal of a first secondary winding N1 of power supply transformer T1 is connected to a first output filter stage 30. First output filter stage 30 generates a first voltage $B+_1$ by smoothing the output voltage at the first output terminal of the secondary winding N1 of power supply transformer T1. First output filter stage voltage supplier 30 has a capacitor C3 coupled in parallel to a secondary rectifier diode D2, with an anode of diode D2 connected to the first output terminal of the first secondary winding N1, an inductor L1 coupled in series between a cathode of diode D2 and an output terminal of first output filter stage 30, a capacitor C4 connected between the cathode of diode D2 and a reference potential, and a capacitor C5 connected in parallel with a resistor R4 between a reference potential and the output terminal of the output filter stage 30. Inductor L1 directs and stores electrical energy, capacitors C4 and C5 are smoothing capacitors, resistor R4 is a discharging resistor, and capacitor C3 provides a snubbing capacitance.

A second output filter stage 40 is connected to a center tap of the second secondary winding N2 of power supply transformer T1 in order to provide voltage $B+_2$ by smoothing an output voltage at the center tap of the second secondary winding. Second output filter stage 40 has a snubbing capacitor C6 connected in parallel with secondary rectifier diode D3, wherein an anode of diode D3 is connected to the center tap between first and second secondary windings, and a cathode of diode D3 is connected to an output terminal of the second power voltage supplier 40. A smoothing capacitor C8 is connected between the cathode of diode D3 and a reference potential, and a discharging resistor R5 is connected between a reference potential and the output terminal of the second output filter stage 40.

A secondary rectifier diode D4 has a cathode connected to a smoothing capacitor C7, which is, in turn, connected together with the second terminal (or ground tap) of the third secondary winding N3 of transformer T1, to a reference potential.

A power voltage controller 50 is connected to the cathode of diode D2 in order to detect changes, or errors, in first output voltage $B+_1$. Power voltage controller 50 adjusts a duty factor, or a duty cycle, of a switching pulse generated by switching driver 60, with a switching drive signal generated in dependence upon those changes or errors. The switching drive pulse is generated by a switching driver 60 in response to the switching drive signal generated by voltage controller 50. Switching driver 60 controls the voltage at the gate of switching transistor Q1.

The surge protection circuit constructed as described above and as illustrated in FIG. 1 drives power supply transformer T1 by generating a switching pulse at a higher voltage level of 500 V to 600 V at the drain of switching transistor Q1 during the ON/OFF mode of operation. The switching pulse follows variations of the voltage level at the gate of transistor Q1 at a state in which a constant level of voltage from voltage doubler 10, for free voltage reception, is applied to the input terminal of the primary winding of power supply transformer T1. Once power supply transformer T1 is initiated to be driven, then certain potential levels are correspondingly induced at respective tap terminals of the secondary winding power supply transformer T1. Accordingly, first voltage $B+_1$ and second voltage $B+_2$ are generated by first output filter stage 30 and second output filter stage 40, respectively.

Figure 2:
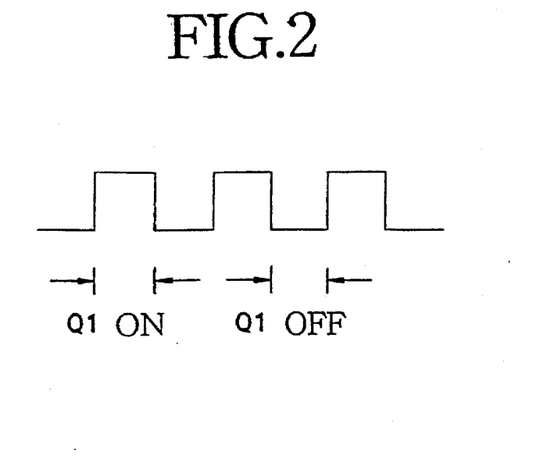
FIG. 2 illustrates a preferred output waveform of a switching drive signal.

Here, the first output filter stage voltage $B+_1$ of first output filter stage 30, which is taken between the first output terminal of the secondary winding of power supply transformer T1 and the reference potential, is detected at power voltage controller 50 and is then fed back to switching driver 60. By adjusting a switching pulse duty factor, or duty cycle, of the switching drive pulse applied to drive switching transistor Q1, an output wave form at the output terminal of switching driver 60 may be stabilized. Such a stabilized waveform is illustrated in FIG. 2.

Snubber circuit 20 coupled between both terminals of the primary winding of power supply transformer T1 protects switching transistor Q1 from an influence of reverse surge caused by power supply transformer T1 at the instant switching transistor Q1 is turned off, while respective secondary rectifier diodes D2 and D3 coupled to first and second power voltage suppliers 30 and 40 are protected by means of snubbing capacitors C3 and C6 connected in parallel to both ends of the respective diodes D2 and D3 to protect those diodes from a surge at a higher voltage level induced at the respective anodes of secondary rectifier diode D2 and D3 at the initial stage of driving power supply transformer T1.

The use of voltage doubler 10 for free voltage reception causes switching transistor Q1, which drives power supply transformer T1, to receive at its drain a switching pulse at a high voltage level of 500 to 600 volts. Once the power supply transformer T1 is driven by a switching pulse of such a high voltage level, then a surge of a correspondingly high level voltage is induced by the secondary winding of transformer T1 at the anodes of the secondary rectifier diodes D2 and D3.

Figure 3:
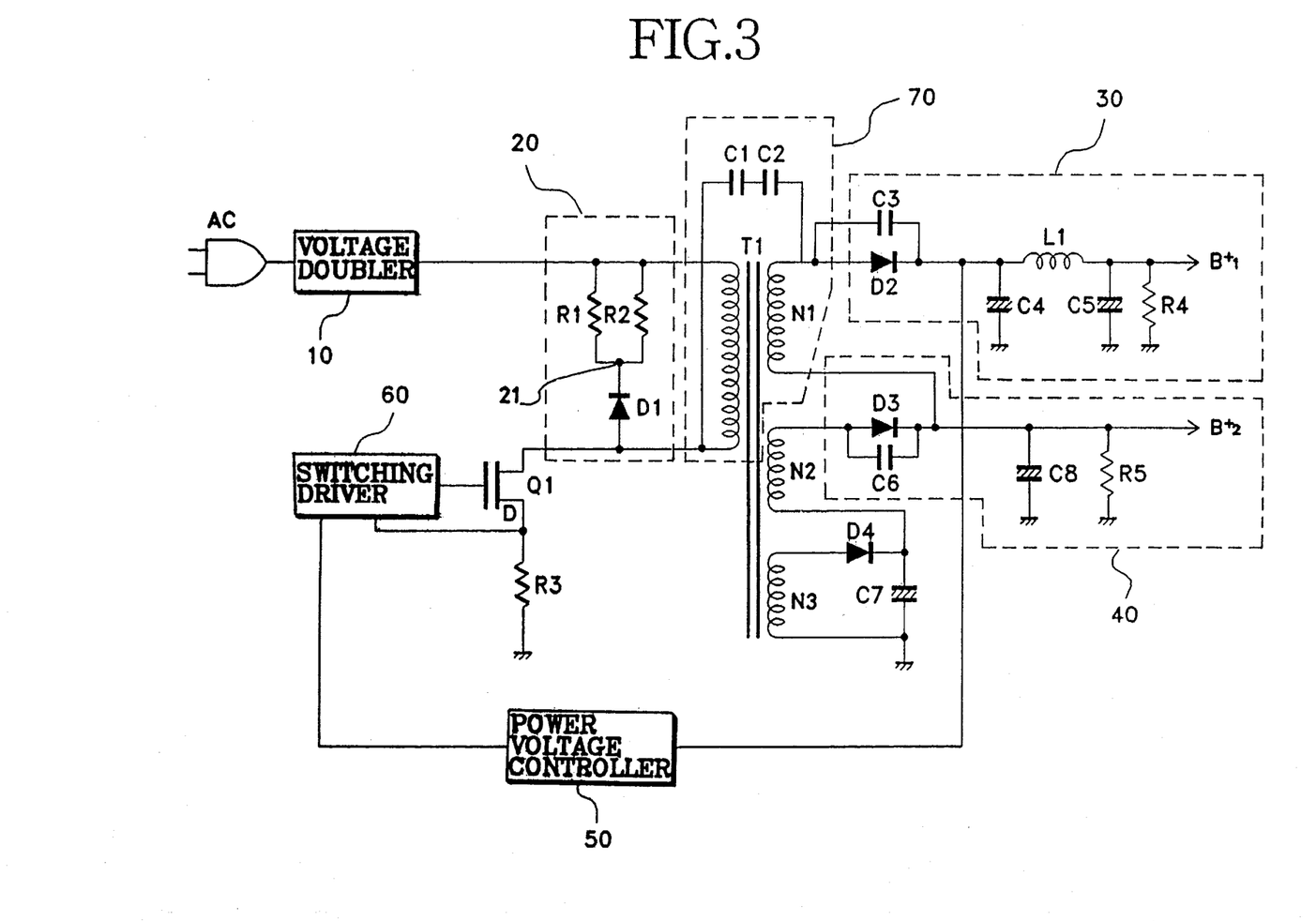
FIG. 3 is a preferred embodiment of surge protecting circuit constructed according to the principles of the present invention.

I have discovered that in order to further protect switching transistor T1 and secondary rectifier diodes D2 and D3 from a surge having a high level voltage owing to the high level voltage of the switching pulse occurring at the drain of switching transistor T1 and owing to leakage inductance of the power supply transformer T1, a surge protection circuit as illustrated in FIG. 3 may be provided.

Referring now in detail to FIG. 3 a preferred embodiment of a surge protection circuit for a switching mode power supply is illustrated wherein similar notations or reference numerals designate similar or corresponding parts as discussed with regard to FIG. 1.

As illustrated in FIG. 3, voltage doubler 10 for redoubling an input alternating current (AC) power to a certain voltage level is connected to an input terminal of a first coil, or primary winding (coil), of a power supply transformer T1. A drain electrode of a switching transistor Q1 such as a filed effect transistor is connected to a control terminal of the first coil of power supply transformer T1, and a source of transformer T1 is connected to a reference potential via a resistor R3. Switching transistor Q1 controls the operation of power supply transformer T1 in response to a driving signal input to the gate, or control electrode of switching transistor Q1.

A snubber circuit 20 uses a pair of resistors R1 and R2 and a diode D1. Resistors R1, R2 are connected in parallel between the first terminal of the primary winding and first node 21. The first node commonly connects resistors R1 and R2 to the input terminal of the primary winding of power supply transformer T1. The second node commonly connects resistors R1 and R2 to the cathode of diode D1. An anode of diode D1 is connected to the drain electrode of switching transistor Q1 and to the second, or control terminal of the primary winding power supply transformer T1. Snubber circuit 20 protects switching transistor Q1 from a reverse surge of current from the power supply transformer T1 during its Off mode of operation since snubber circuit 20 is coupled between both terminals of the primary winding of the power supply transformer T1.

A first output terminal of the first secondary winding N1 (coil), of power supply transformer T1 is connected to a first output filter stage supplier 30. Filter 30 generates a power voltage B+$_1$ by smoothing the output voltage at the first output terminal of the winding N1 of the power supply transformer T1. Filter 30 uses a capacitor C3 coupled in parallel to a secondary rectifier diode D2, wherein an anode of diode D2 is connected to the first output terminal of the winding N1, an inductor L1 coupled in series between a cathode of diode D2 and an output terminal of first power voltage supplier 30, a capacitor C4 is connected between the cathode of diode D2 and a reference potential, and a capacitor C5 is connected in parallel with a resistor R4 between a reference potential and the output terminal of the first power voltage supplier 30. Inductor L1 directs and stores electrical energy, capacitors C4 and C5 arc smoothing capacitors, resistor R4 is a discharging resistor, and capacitor C3 provides a snubbing capacitance.

A second output filter stage 40 is connected to a center tap of the second coil of power supply transformer T1 for generating power voltage B+$_2$ by smoothing an output voltage at the center tap of the second secondary winding N2. Second filter 40 uses a snubbing capacitor C6 connected in parallel with secondary rectifier diode D3, wherein an anode of diode D3 is connected to the center tap of the second coil and a cathode of diode D3 is connected to an output terminal of the second filter 40, a smoothing capacitor C8 is connected between the cathode of diode D3 and a reference potential, and a discharging resistor R5 is connected between a reference potential and the output terminal of the second filter 40.

A secondary rectifier diode D4 has a cathode connected to a smoothing capacitor C7 which is, in turn, connected to a reference potential.

A power voltage controller 50 is connected to the cathode of diode D2 for detecting changes, or errors, in first power voltage B+$_1$. Power voltage controller 50 adjusts a duty factor, or duty cycle, of a switching drive signal applied to switching driver 60. The switching drive pulses are generated by switching driver 60 in response to the switching driver signal output by voltage controller 50. Switching driver 60 controls the voltage at the gate of switching transistor Q1.

The surge protection circuit constructed as described above and as illustrated in FIG. 3 drives power supply transformer T1 by generating a switching pulse at a higher voltage level of 500 V to 600 V at the drain of switching transistor Q1 during the ON/OFF operation. The switching pulse follows the variations in the amplitude of the voltage at the gate of transistor Q1 at a state in which a constant level of voltage from voltage doubler 10, for free voltage reception, is applied to the input terminal of the primary winding of power supply transformer T1. Once power supply transformer T1 is initiated to be driven, then certain potential levels are correspondingly induced at respective tap terminals of the secondary windings of power supply transformer T1. Accordingly, first voltage B+$_1$ and second voltage B+$_2$ are generated by first output filter 30 and second output filter 40, respectively.

Here, the first voltage B+$_1$ from filter 30, which is connected to an output terminal of the first secondary winding N1, is detected by controller 50 and is then fed back to switching driver 60. By adjusting a switching pulse duty factor or duty cycle, of the switching drive signal for driving switching transistor Q1, an output wave, form of the drive phases occurring at the output terminal of switching driver 60 is stabilized. Such a stabilized waveform is illustrated in FIG. 2.

Snubber circuit 20 coupled between both terminals of the first secondary winding N1 power supply transformer T1 protects switching transistor Q1 from an influence of overheating caused by reverse surge caused by power supply transformer T1 at the instant switching transistor Q1 is turned off, while respective secondary rectifier diodes D2 and D3 coupled to first and second output filters 30 and 40 are protected by means of snubbing capacitors C3 and C6 connected in parallel to both ends of the respective diodes D2 and D3, from surges at a higher level voltage induced at the respective anodes of secondary rectifier diode D2 and D3 occurring during the initial stage of driving power supply transformer T1.

The use of voltage doubler 10 for free voltage reception causes switching transistor Q1 such as a filed effect transistor, which drives power supply transformer T1, to receive at its drain a switching pulse at a high voltage level of 500 to 600 volts. Once the power supply transformer T1 is driven by a switching pulse of such a high voltage level, then a surge of a correspondingly high voltage is induced by the second coil at the anodes of the secondary rectifier diodes D2 and D3.

In order to further protect switching transistor T1 and secondary rectifier diodes D2 and D3 from a surge having a high level voltage owing to the high level voltage of the switching pulse at the drain electrode of switching transistor T1 and owing to leakage inductance of the power supply transformer T1, a protection circuit 70 may be constructed with a pair of capacitors connected in series between the anode of diode D1 and the anode of secondary rectifier diode D2.

Protection circuit 70 snubs bi-directional surges so as to simultaneously attenuate a surge induced reversely from power supply transformer T1 at the drain terminal of switching transistor Q1 at the instant of turning off switching transistor Q1, and another surge having a pulse of a high level voltage being concurrently induced at the anode of second rectifier diode D2 during the driving power supply transformer T1.

Protection circuit 70 preferably has series coupled capacitors C1 and C2 for snubbing a bi-directional surge in view of switching phase difference between the primary and second windings of power supply transformer T1 being substantially 180 degrees out of phase.

Referring now to the above configuration, the surge protecting circuit for a switching mode power supply will be described in greater detail. As shown in FIG. 3, the voltage level of the input voltage is at a substantially constant level of, 300 volts for example, is supplied to first coil input terminal of the primary winding of power supply transformer T1 by virtue of voltage doubler 10, and a drain terminal of transistor Q1 is connected to the control terminal of the first coil. The gate electrode of switching transistor Q1 receives a drive pulse signal having a rectified waveform as shown in FIG. 2 from switching driver 60, and thereby controls power supply transformer T1, fed with a supply voltage from voltage doubler 10, during the ON/OFF mode of operation of switching transistor Q1.

Once power supply transformer T1 is being driven, then corresponding voltage levels are induced into individual turns of the secondary windings of transformer T1 to thereby generate first voltage $B+_1$ and second power voltage $B+_2$. First voltage $B+_1$ and second voltage $B+_2$ are then smoothed by the circuitry of first filter 30 and second filter 40, respectively.

Changes, or errors, in voltage $B+_1$ are detected by power voltage controller 50 and for back to switching driver 60. The voltage fed back controls switching driver 60 to adjust the duty factor, or duty cycle, of a switching pulse in the driving signal applied to the gate of switching transistor Q1.

Figure 4:
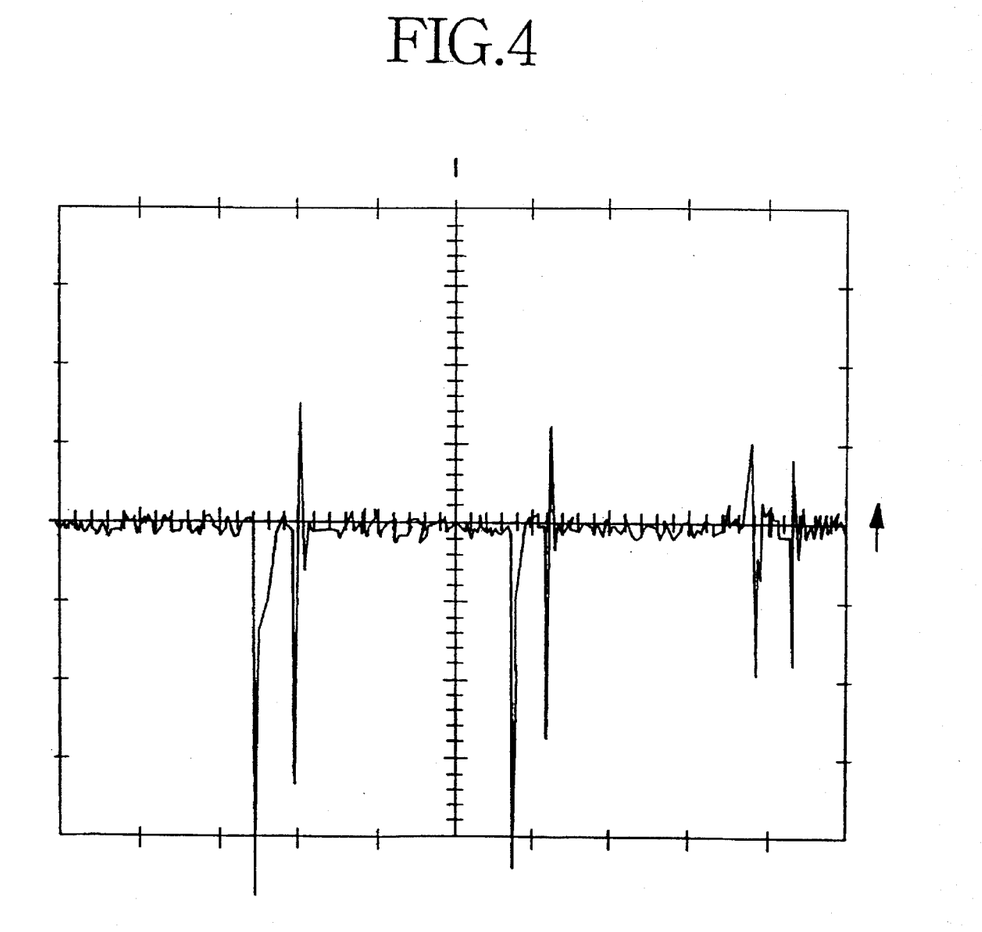
FIG. 4 is a two coordinate graph illustrating a switching waveform of pulses alternating through capacitors installed in accordance with the principles of the present invention to snub bi-directional surges.
Figure 5:
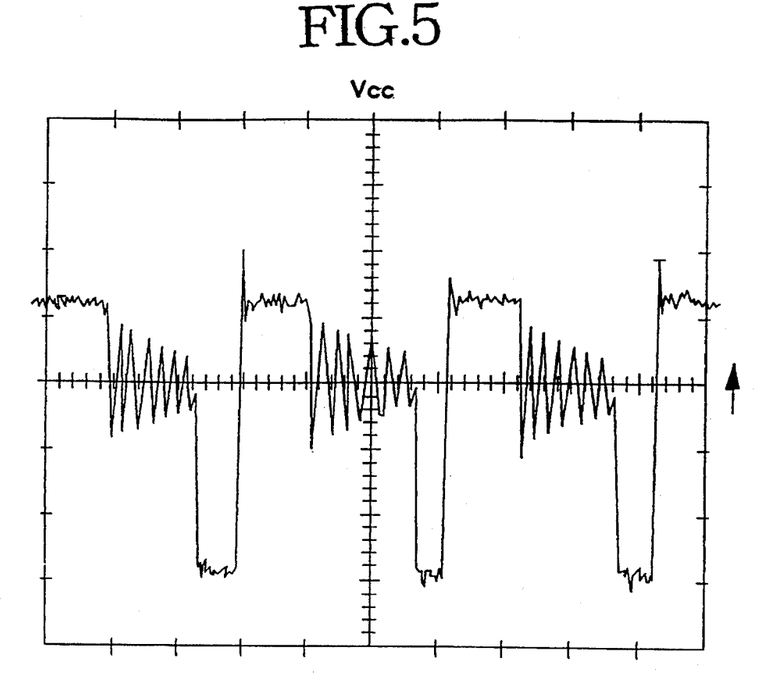
FIG. 5 is a two coordinate graph illustrating the waveform of switching pulse generated across the primary winding of a transformer of a circuit constructed in accordance with the principles of the present invention.

During the ON/OFF mode of operation of switching transistor Q1, which is driven by the driving signal as described above, once switching transistor Q1 is turned off, a reverse surge current is induced at the drain terminal of switching transistor Q1 by reaction of inductance upon the primary winding of power supply transformer T1 at substantially the same time. Owing to capacitors C1 and C2 for snubbing bi-directional surge coupled between the drain terminal of switching transistor Q1, and correspondingly to the anode of diode D1 in snubber circuit 20, which is connected to the control terminal of first coil of power supply transformer T1 and the anode terminal of secondary rectifier diode D2, the peak value of the above described surge current as illustrated in FIG. 4 is absorbed. Accordingly a switching pulse signal whose surge-attenuated waveform is illustrated in FIG. 5 is provided at the drain terminal of switching transistor Q1.

Figure 6:
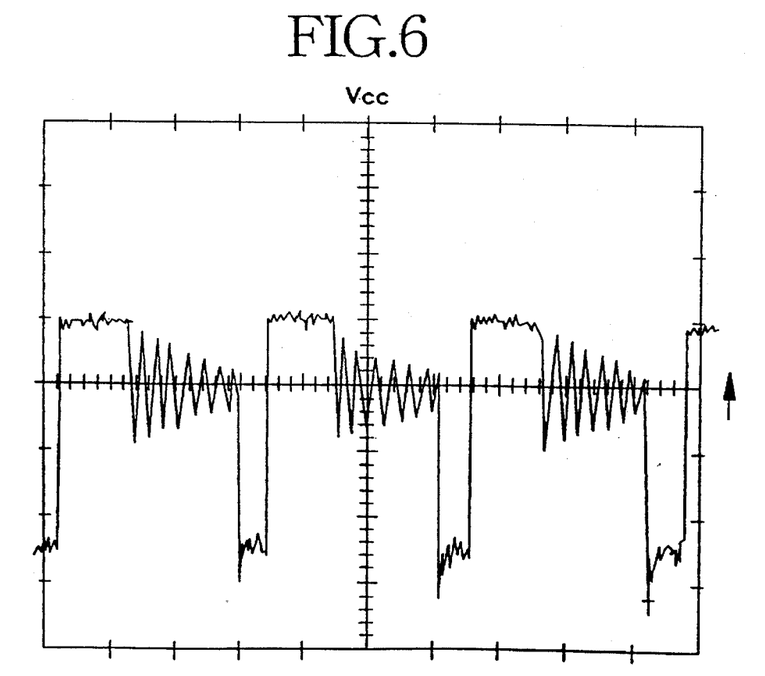
FIG. 6 is a two coordinate graph illustrating the waveform of a switching pulse generated across the secondary winding of a transformer of a circuit constructed in accordance with the principles of the present invention.

On the contrary, at the initial stage of turning on switching transistor Q1, a high voltage pulse is induced and is applied to the drain terminal of switching transistor Q1, and a surge current of such a high amplitude voltage pulse is thereby induced at the anode of secondary rectifier diode D2 during the driving operation of power supper transformer T1. Such a surge so induced looses its current value at around its peak waveform by the absorption operation of snubbing capacitors C3 and C6 coupled in parallel across both end terminals of secondary rectifier diodes D2 and D3, respectively, in first filer 30 and second power voltage supplier 40. Series capacitors C1 and C2 snub the bi-directional surge between the drain terminal of switching transistor Q1 and the anode terminal of secondary rectifier diode D2. Accordingly, the sharply edged peak current values illustrated in FIG. 4 are shifted by attenuation, into the shape of a waveform as shown in FIG. 6. The surge attenuated switching pulse waveform shown in FIG. 6, is thereby supplied to the anode terminal of secondary rectifier diode D2.

According to the surge protection circuit for a switching mode power supply as described above, a pair of capacitors for snubbing bi-directional surge are serially connected and effectively use the switching phase difference of 180 degrees between the drain terminal of switching transistor Q1 and the anode terminal of secondary rectifier diode D2, in order to attenuate surges caused by switching the switching transistor Q1 between an ON state and an OFF state. Accordingly, switching transistor Q1 is protected due to a reduction in heat within the switching transistor Q1, and the diodes are protected from being damaged from induced surge voltages.

While there have been illustrated and described what is considered to be the preferred embodiment of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A switching mode power supply having a voltage doubler for supplying a substantially constant voltage to a first coil of a power supply transformer and for controlling a driving operation of the power supply transformer during ON/OFF operations of a switching transistor driven by a switching drive signal having a duty cycle which is adjusted in response to a detected power voltage induced in a second coil of the power supply transformer, said switching mode power supply incorporating a surge protection circuit, said surge protection circuit comprising:

means connected between an input terminal and a control terminal of said first coil for protecting said switching transistor from a reverse surge induced by said power supply transformer during an OFF operation of said switching transistor; and means coupled between said control terminal of said first coil and an output terminal of a second coil of said power supply transformer for snubbing bi-directional surges induced during said ON/OFF operations of said switching transistor.

2. The circuit as set for in claim 1, said means for snubbing bi-directional surges comprising a pair of capacitors connected in series between said control terminal of said first coil and said output terminal of said second coil.

3. A switching mode power supply comprising:

a power supply transformer having a first coil and a second coil, said first coil having a first terminal for receiving an input supply voltage and a second terminal for receiving a switching signal, said second coil having an output terminal for providing a power voltage to a load;

switching means for generating said switching signal in response to a drive signal;

snubbing means connected in parallel with said first coil for protecting said switching means from a reverse surge induced by said power supply transformer during an OFF operation of said switching means;

means connected to said output terminal of said second coil for smoothing said power voltage;

means for generating said drive signal by detecting an error in said power voltage; and surge protection means coupled between said control terminal of said first coil and said output terminal of a second coil of said power supply transformer for snubbing bi-directional surges induced during ON/OFF operations of said switching means.

4. The switching mode power supply as set forth in claim 3, further comprising:

a center tap connected to said second coil for outputting a second power voltage; and means connected to said center tap for smoothing said second power voltage.

5. The switching mode power supply as set forth in claim 3, said snubbing means comprising:

first and second resistors connected in parallel between a first node and a second node, said first node being connected to said first terminal of said first coil; and a diode having a cathode connected to said second node and an anode connected to said second terminal of said first coil.

6. The switching mode power supply as set forth in claim 3, said surge protection means comprising:

a first capacitor and a second capacitor connected in series between said second terminal of said first coil and said output terminal of said second coil.

7. The switching mode power supply as set forth in claim 3, said switching means comprising:

a switching driver for generating switching pulses and for adjusting a duty factor of said switching pulses in response to said drive signal; and a switching transistor having a gate connected to said switching driver for receiving said switching pulses, a source connected to a reference potential and a drain connected to said second terminal of said first coil for providing said switching signal to said power supply transformer.

8. The switching mode power supply as set forth in claim 3, said means connected to said output terminal of said second coil for smoothing said power voltage comprising:

a snubbing capacitor coupled in parallel to a secondary rectifier diode, an anode of said secondary rectifier diode being connected to said output terminal of said second coil, said secondary rectifier diode being protected from surges by said snubbing capacitor and said surge protection means;

an inductor coupled in series between a cathode of said secondary rectifier diode and an output of said switching mode power supply;

a first smoothing capacitor connected between the cathode of said secondary rectifier diode and a reference potential;

a second smoothing capacitor connected between a reference potential and the output of said switching mode power supply; and a discharging resistor connected in parallel with said second smoothing capacitor.

9. The switching mode power supply as set forth in claim 4, said means connected to said center tap for smoothing said second power voltage comprising:

a snubbing capacitor coupled in parallel to a secondary rectifier diode, an anode of said secondary rectifier diode being connected to said center tap of said second coil, said secondary rectifier diode being protected from surges by said snubbing capacitor and said surge protection means;

a smoothing capacitor connected between the cathode of said secondary rectifier diode and a reference potential; and a discharging resistor connected in parallel with said smoothing capacitor.

10. A method for surge protecting a switching mode power supply, comprising:

applying a source of alternating electrical current across a primary winding of a transformer, said transforming having a plurality of secondary windings;

driving from variations of voltage across one of said secondary windings, a switching pulse signal exhibiting a train of pulses characterized by a duty cycle and varying said duty cycle in response to magnitude of said voltage occurring across said one of said secondary windings;

controlling said electrical current flowing through said primary winding by driving a switch serially between one lead of said primary winding and a reference potential between an electrically conductive state accommodating flow of said electrical current through said primary winding and said reference potential and an electrically non-conductive state preventing said flow, in dependence upon said switching pulse signal;

source voltage and a secondary winding for outputting an induced power voltage, a driving operation of the power supply transformer being controlled during ON/OFF operations of a switching transistor driven by a switching drive signal having a duty cycle which is adjusted in response to a level of said power voltage, said method comprising the steps of:

protecting said switching transistor from a reverse surge induced by said power supply transformer during an OFF operation of said switching transistor by connecting a snubber in parallel with said primary winding; and snubbing bi-directional surges induced during said ON/OFF operations of said switching transistor by connecting a first capacitor and a second capacitor in series between a control terminal of said primary winding and an output terminal of said secondary winding.

* * * * *